United States Patent
Jayabalan et al.

(10) Patent No.: US 7,024,859 B2
(45) Date of Patent: Apr. 11, 2006

(54) COMBUSTION ENGINE ACCELERATION SUPPORT USING AN INTEGRATED STARTER/ALTERNATOR

(75) Inventors: Ranjit Jayabalan, Rolla, MO (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 10/770,357

(22) Filed: Feb. 2, 2004

(65) Prior Publication Data

US 2005/0166594 A1 Aug. 4, 2005

(51) Int. Cl.
*F01B 21/04* (2006.01)

(52) U.S. Cl. .......................... 60/716; 60/718
(58) Field of Classification Search ................. 60/716, 60/718
See application file for complete search history.

(56) References Cited

U.S. PATENT DOCUMENTS

| | | | |
|---|---|---|---|
| 4,335,429 A | 6/1982 | Kawakatsu | |
| 4,958,095 A | 9/1990 | Uchida et al. | |
| 5,701,062 A * | 12/1997 | Barrett | ........................ 318/51 |
| 5,789,882 A | 8/1998 | Ibaraki et al. | |
| 5,865,263 A | 2/1999 | Yamaguchi et al. | |
| 6,124,690 A | 9/2000 | Yano et al. | |
| 6,133,702 A | 10/2000 | Noble et al. | |
| 6,176,807 B1 * | 1/2001 | Oba et al. | ........................ 477/5 |
| 6,176,808 B1 | 1/2001 | Brown et al. | |
| 6,177,734 B1 | 1/2001 | Masberg et al. | |
| 6,240,890 B1 | 6/2001 | Abthoff et al. | |
| 6,315,068 B1 * | 11/2001 | Hoshiya et al. | ............ 180/65.2 |
| 6,335,609 B1 | 1/2002 | Amey et al. | |
| 6,336,889 B1 * | 1/2002 | Oba et al. | ........................ 477/5 |
| 6,364,042 B1 | 4/2002 | Joachim | |
| 6,394,208 B1 | 5/2002 | Hampo et al. | |
| 6,453,863 B1 | 9/2002 | Pels et al. | |
| 6,453,864 B1 | 9/2002 | Downs et al. | |
| 6,543,561 B1 | 4/2003 | Pels et al. | |
| 6,585,066 B1 | 7/2003 | Koneda et al. | |
| 2001/0052760 A1 | 12/2001 | Amano et al. | |
| 2003/0019674 A1 | 1/2003 | Duan | |

* cited by examiner

Primary Examiner—Hoang Nguyen
(74) Attorney, Agent, or Firm—Pauley Petersen & Erickson

(57) ABSTRACT

A method of providing acceleration support to a combustion engine using an integrated starter/alternator. The integrated starter/alternator is in rotational combination with the crankshaft and connected to a battery system. The integrated starter/alternator is adapted to function at times as a power source adding torque to rotate the crankshaft to overcome friction and non-linear hydrodynamic forces within the engine. At other times the integrated starter/alternator functions as a power generator for subtracting torque from the crankshaft to provide electrical current to the battery system.

21 Claims, 4 Drawing Sheets

COMBUSTION ENGINE ACCELERATION SUPPORT USING AN INTEGRATED STARTER/ALTERNATOR

FIELD OF THE INVENTION

This invention relates generally to a method for improving the engine acceleration rate of a conventional internal combustion engine. More particularly, the invention relates to a method of using an integrated starter/alternator, i.e., an electromagnetic motor/generator, for acceleration support for a combustion engine.

BACKGROUND OF THE INVENTION

The internal combustion engine (ICE) is generally the main source of traction power in a conventional vehicle. Fuel is injected into the cylinders of the ICE and is ignited, which displaces the piston resulting in a reciprocating movement and, consequently, a rotating crankshaft torque and speed output. The ICE has the capacity to accelerate a vehicle to a high speed within seconds, thereby giving the best in driving experience and maneuverability. However, such mechanical power transfer results in a relatively low engine efficiency, typically about 20–30%.

The ICE generally performs optimally and at best efficiency if the speed and torque output demands do not vary extensively, i.e., the ICE is more efficient at a constant speed and torque operation. Generally, the more speed or torque changes that occur, the lower the efficiency of the ICE. A typical example is during acceleration. One reason for low efficiency is that during a high rate of change in speed demand a large amount of fuel is injected into the cylinders and ignited, but not all of the fuel is burnt. In addition, a significant portion of the fuel is partly burnt. Therefore, more fuel is consumed than actually required for a stated acceleration. The inefficient burn generally leads to higher emissions of $NO_x$, CO, and hydrocarbon particulate matter. Also, during acceleration additional torque is required by the ICE itself to accelerate various engine components to overcome friction and nonlinear hydrodynamic forces in the cylinders. These factors tend to increase fuel consumption and emission levels, and reduce the response time and, hence, the acceleration rate.

Hybrid electric vehicles use an ICE and an electric motor in combination for traction application with a defined hybridization factor. The use of the electric motor, which is a dynamic system, provides better response to torque and speed demands. In many hybrid electric vehicles, the electric motor provides the initial traction power output, often referred to as "electric launch assist," and, after a predefined speed level, the ICE and the electric motor together aid in providing traction. The electric motor provides a direct traction support to accelerate the vehicle. The electric motors for accelerating a vehicle are relatively large machines having capacities of 10 kilowatts and higher. In addition, the electrical power for operating an electric motor is supplied by high capacity battery pack, such as having a high voltage of 100 volts, or higher.

Over the past few decades, the overall power demand in automobiles has been increasing. Until recently, the electrical loads in automobiles were typically a few lighting loads and a starter motor. However, the current safety and entertainment loads that are now becoming typical and/or standard vehicle equipment impose a high level of load demand on the typical 12 volt system. Also, traditional pneumatic, hydraulic, and mechanical driven loads are often being replaced by electrical systems for improved performance, efficiency, and reliability. This transition brings about the concept of "Power on Demand," making power available when required. The average power demand in near-future vehicles is expected be about 5 kilowatts and the peak demand will be as high as about 12 to 15 kilowatts. Performance loads such as an electromagnetic valve train (EVT), which have power requirements that increase from about 1 kilowatt to 4 kilowatts with speed, and electric steering systems that have peak loads of about 1.5 kilowatts, will impose higher demands on vehicular power system.

The current power generation systems in automobiles, such as the conventional production alternator, can typically generate power efficiently up to about 1.5 to 2 kilowatts. Attempts to generate higher power often result in substantial power loss and unacceptable cooling requirements, thereby lowering system efficiency. Integrated Starter/Alternators (ISA) are being developed as an alternative electrical power solution that provides high power both efficiently and reliably. The ISA is essentially a single machine performing the function of both the starter motor and alternator.

The ISA is an electromagnetic motor/generator that is connected directly to the crankshaft of the ICE. The ISA machine generally has a stator and a rotor like any other electric machine. The rotor of the ISA is often placed directly on the crankshaft while the stator is fixed to the body of the ICE. The rotor on the crankshaft can eliminate belt and gear engagement mechanisms and their associated losses and wear and tear, thereby reducing system components and increasing reliability. The power output of the typical ISA is considerably less than the electric motors used in hybrid vehicles. Current ISA machines generally have capacities of about 2 kilowatts to 6 kilowatts, as compared to the 10 kilowatt or greater capacity in typical hybrid electric vehicles, and thus the ISA machines are generally not powerful enough to, nor designed to, accelerate a vehicle or provide "launch assist."

There is a need for an improved combustion engine for incorporation into conventional vehicles. More particularly, there is a need for a combustion engine that has improved acceleration and efficiency with reduced emissions.

SUMMARY OF THE INVENTION

A general object of the invention is to provide an improved combustion engine with an increased rate of engine acceleration, higher efficiency, and lower emissions.

A more specific objective of the invention is to overcome one or more of the problems described above.

The general object of the invention can be attained, at least in part, through a method of increasing an acceleration rate of a combustion engine during combustion engine acceleration; the combustion engine including a crankshaft. The method includes providing an electromagnetic motor/generator in rotating combination with the crankshaft. The electromagnetic motor/generator is adapted to rotate the crankshaft upon receiving an electrical current from a battery system. The method further includes determining an acceleration demand of the combustion engine and powering the electromagnetic motor/generator with the electrical current. The electrical current is proportional to the acceleration demand. The rotational speed of the crankshaft is increased by the electromagnetic motor/generator and increasing the rotational speed of the crankshaft by the electromagnetic motor/generator increases the acceleration rate of the combustion engine.

The method of this invention represents a novel use for integrated starter/alternators. The prior art generally fails to disclose improving combustion engine acceleration through the use of an electromagnetic motor/generator for acceleration support.

The invention further comprehends a method of operating a vehicle including a combustion engine, a transmission, an electromagnetic motor/generator, and a control system. The combustion engine has a crankshaft connected to the transmission. The electromagnetic motor/generator is in rotational combination with the crankshaft and connected to a battery system. The control system is in controlling combination with the electromagnetic motor/generator. The electromagnetic motor/generator is adapted to function at times as a power source adding torque to rotate the crankshaft and at other times to function as a power generator for subtracting torque from the crankshaft to provide electrical current to the battery system. An acceleration demand of the combustion engine during engine acceleration is first determined. The control system directs a first electrical current from the battery system to the electromagnetic motor/generator during combustion engine acceleration, where the first electrical current is proportional to the acceleration demand. The electromagnetic motor/generator is powered with the first electrical current during acceleration of the combustion engine to add torque to the crankshaft. The control system also determines whether there is a low electrical charge in the battery system and/or a high vehicle electrical operating load and can remove the first electrical current, thereby switching the electromagnetic motor/generator from the drive mode to the generation mode. The electromagnetic motor/generator is then powered with the crankshaft to produce a second electrical current that is directing with the control system to the battery system. The second electrical current charges the battery system and/or provides additional electrical load needed during periods of a high vehicle electrical operating load.

Other objects and advantages will be apparent to those skilled in the art from the following detailed description taken in conjunction with the appended claims and drawings.

DETAILED DESCRIPTION OF THE INVENTION

The present invention provides a method for using an integrated starter/alternator, referred to below as an electromagnetic motor/generator, to provide acceleration support to an internal combustion engine of a vehicle. The method of this invention extends the application of the electromagnetic motor/generator beyond its current uses in starting a combustion engine and power generation. The method of this invention can use known electromagnetic motor/generators to provide acceleration support to increase combustion engine acceleration rates.

The electromagnetic motor/generator used in the method of this invention is an electric machine mounted on a crankshaft of a combustion engine. The method of this invention is a control strategy for providing additional torque to the combustion engine during acceleration to raise the engine speed rapidly. The method of this invention can provide acceleration support not only during initial acceleration, i.e., vehicle launch, but throughout the drive cycle.

The method of this invention uses an electromagnetic motor/generator to provide acceleration support to a combustion engine by adding torque to the crankshaft during engine acceleration. The acceleration support provides additional power to aid the engine in overcoming friction and nonlinear hydrodynamic forces within the engine, thereby providing an increased rate of engine acceleration. The electromagnetic motor/generator does not provide traction support to accelerate the vehicle, such as in common for the larger capacity electric motors of hybrid electric vehicles. The method of this invention uses the electromagnetic motor/generator to provide faster, more reliable, and smoother engine acceleration, enhance vehicle maneuverability, reduce combustion engine response time, and lower engine stress, fuel consumption, and emissions.

Figure 1:
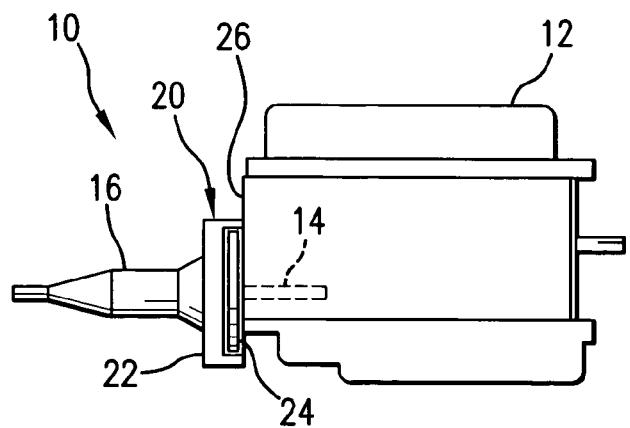
FIG. 1 is a general representation of a vehicle drive system including an electromagnetic motor/generator for use in one embodiment of this invention.

FIG. 1 is a general representation of a vehicle drive system 10. The drive system 10 includes a combustion engine 12, such as any conventional internal combustion engine known in the art. The combustion engine 12 has a crankshaft 14 that connects the combustion engine 12 to a transmission 16. The crankshaft 14 is rotated during engine operation by cylinders (not shown) within the combustion engine 12. An electromagnetic motor/generator 20 is connected in rotating combination with the crankshaft 14. As will be appreciated by one skilled in the art following the teachings herein provided, various configurations of the electromagnetic motor/generator, such as are known in the art, are available for use in the control strategy of this invention. As will also be appreciated, the electromagnetic motor/generator 20 includes a circular rotor 22 attached to the crankshaft 14 through a center of the rotor. The electromagnetic motor/generator 20 also includes a stator 24 that is fixed in place, such as to a body 26 of the engine 12.

Figure 2:
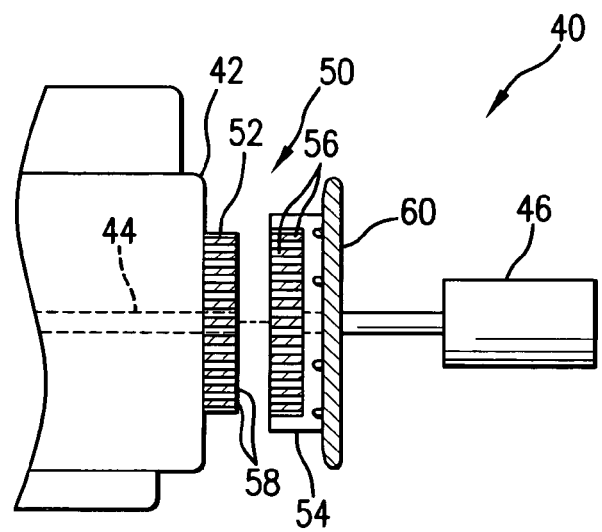
FIG. 2 is a partially exploded view of another vehicle drive system including an electromagnetic motor/generator for use in another embodiment of this invention.

FIG. 2 is a partially exploded view of a vehicle drive system 40. The vehicle drive system 40 includes a combustion engine 42 also having a crankshaft 44 that extends to a transmission 46. An electromagnetic motor/generator 50 includes a stator 52 fixedly connected to the combustion engine 42 and a rotor 54 connected to the crankshaft 44. The crankshaft 44 extends through the center of both the stator 52 and the rotor 54. The rotor 54 extends and rotates around the stator 52. As known in the art such as in brushless permanent magnet motors, a plurality of magnets 56 on the rotor 54 are used in combination with a plurality of windings 58 on the stator to power the electromagnetic motor/generator 50 to rotate the rotor 54 upon receiving an electrical current to produce torque and rotate the crankshaft 44 or, alternatively, to generate electrical current through rotation of the rotor 54 by the crankshaft 44. In one embodiment, the stator windings 58 are fed by a power controller, such as a DC-AC converter, which controls the voltage, current, and frequency that are supplied to the electromagnetic motor/generator 50, thereby controlling the speed and torque of the electromagnetic motor/generator 50. As shown in FIG. 2, a flywheel 60, as known in the art, can be optionally connected to the rotor 54 such that the flywheel 60 rotates when the rotor 54 and the crankshaft 44 rotate.

Figure 3:
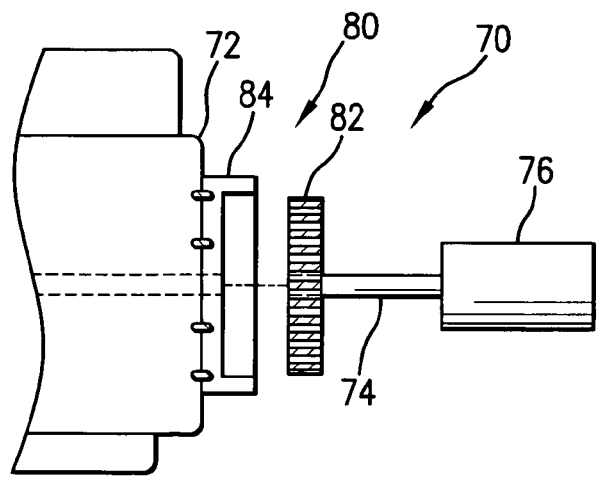
FIG. 3 is a partially exploded view of yet another vehicle drive system including an electromagnetic motor/generator for use in yet another embodiment of this invention.

As will be appreciated by one skilled in the art following the teachings herein provided, alternative configurations of the electromagnetic motor/generator are available for use in the control strategy of this invention. FIG. 3 is a partially exploded view of an alternative vehicle drive system 70 including a combustion engine 72, a crankshaft 74 connecting the combustion engine 72 to a transmission 76, and an electromagnetic motor/generator 80. As shown in FIG. 3, the electromagnetic motor/generator 80 includes a circular, disc-shaped rotor 82 connected to the crankshaft 74 and adapted to rotate and/or rotate with the crankshaft 74. The electromagnetic motor/generator 80 also includes a stator 84 fixedly connected to the engine 72. In this embodiment, the stator 84 extends around the rotor 82, and during operation the rotor 82 rotates within the stator 84.

In one embodiment of this invention, the electromagnetic motor/generator rotor has a diameter of about 250 to about 325 mm and a depth of about 50 to about 60 mm. Forming the rotor with a relatively small depth allows the electromagnetic motor/generator to have a size that allows placement between the combustion engine and the transmission, or at the front end of conventional combustion engines where the belt drive typically exits. The positioning of the electromagnetic motor/generator can vary for reasons such as, for example, ease of design and servicing.

The electromagnetic motor/generator used in the method of this invention is connected to a battery system. The battery system provides the power to drive the electromagnetic motor/generator during combustion engine acceleration.

In a generation mode or a regeneration mode, the electromagnetic motor/generator produces an electrical current that charges the battery system. In one embodiment of this invention, the battery system provides a 5 kilowatt (kW) electrical current to power the electromagnetic motor/generator to rotate a vehicle crankshaft. In this embodiment, the electromagnetic motor/generator is desirably connected to a 42 volt battery system. A 42 volt battery system is desirable as generating a relatively high power of 5 kilowatts with a conventional 14 volt system typically involves using higher electrical currents, higher and more expensive insulation and thicker cables. Also, as will be appreciated, the vehicle performance loads that require high power will be more efficient at 42 volts than at 14 volts.

In one embodiment of this invention, a 42 volt electromagnetic motor/generator is mechanically integrated to a crankshaft and electrically connected to a 42 volt battery system including an ultra-capacitor. The 42 volt battery stores and supplies power to the loads while the ultra-capacitor enables large amounts of power to be supplied over a short period of time such as during engine cranking periods or allows efficient storage of power during regeneration. The ultra-capacitor can also absorb large voltage during load dumps where the voltage can go as high as 58 volts for a 42 volt system. The ultra-capacitor also can extend the battery life, as the method of this invention operates on the concept of power on demand, where relatively large loads are frequently turned on and off, such as when the electromagnetic motor/generator provides acceleration support to the combustion engine.

In one embodiment of this invention, the electromagnetic motor/generator is able to deliver at least 5 kilowatts over an entire engine speed range. The electromagnetic motor/generator has the capacity to deliver high torque of about 150 to about 300 Newton-meters (Nm), compared to about 150 to about 200 Newton-meters by the typical conventional automotive starter motor used for cranking and starting the engine. The speed of rotation of a conventional starter motor is about 100 to 150 rpm. Known electromagnetic motor/generators for use in the method of this invention can crank the engine at a speed of about 400 rpm for fast engine starts, thus enabling a start up time of about 0.1 seconds, compared to about 2 to 2.5 seconds by conventional starter motors.

Currently, electromagnetic motor/generators are used as a starter motor to initially crank and start a combustion engine and then, upon engine starting, to operate as a generator, i.e., an alternator. The method of this invention provides a control strategy for a more extensive use of an electromagnetic motor/generator, such as, for example, any of the electromagnetic motor/generators described above. The electromagnetic motor/generator is used to provide acceleration support to a combustion engine by increasing the acceleration rate of the combustion engine during engine acceleration. The acceleration support is provided by the electromagnetic motor/generator through the engine crankshaft by adding torque to, and thereby increasing the rotational speed of, the crankshaft.

Figure 4:
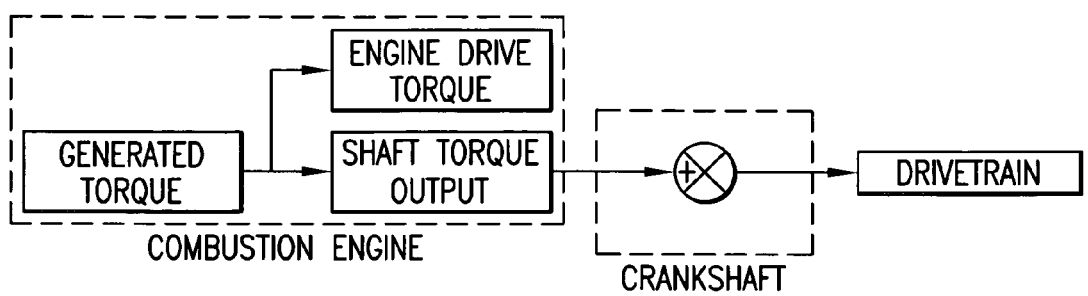
FIG. 4 is a block diagram of torque flow in a typical conventional vehicle drive system for use in still yet another embodiment of this invention.
Figure 5:
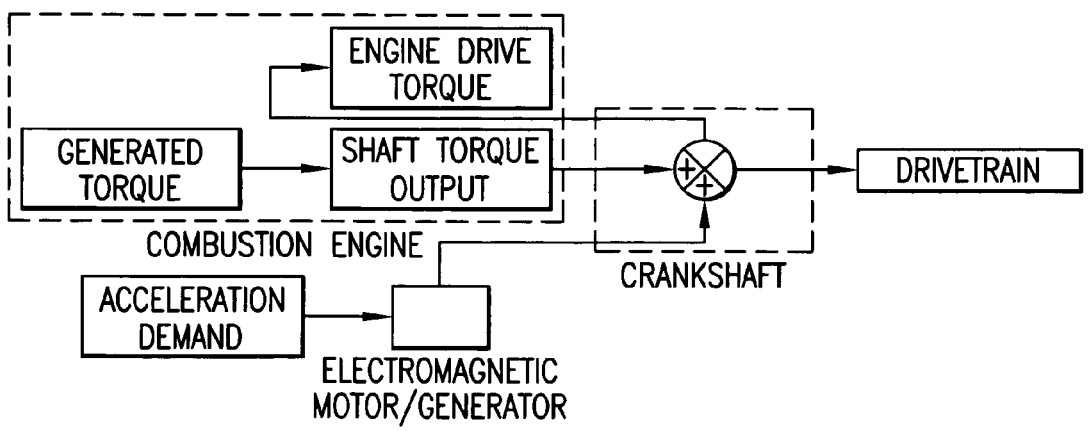
FIG. 5 is a block diagram of torque flow in a vehicle drive system with acceleration support during a motoring mode using an electromagnetic motor/generator according to one embodiment of this invention.

When a vehicle accelerates, in many cases, there is only a demand for higher speed, but the traction torque demand can remain the same. However, as discussed above, the combustion engine, in order to accelerate to a higher engine speed, must accelerate its engine components, first overcoming friction and nonlinear hydrodynamic forces. The additional power required to overcome the friction and nonlinear hydrodynamic forces increases the engine acceleration time and also decreases engine efficiency. Torque flow that takes place in a typical vehicle drive system is shown in FIG. 4. The combustion engine produces the engine drive torque and the shaft torque output. The method of this invention, as shown in FIG. 5, uses an electromagnetic motor/generator to increase the acceleration rate of a combustion engine by adding torque to the engine, through the crankshaft, to overcome some and desirably substantially all of the friction and nonlinear hydrodynamic forces between the moving components of the combustion engine. Through a comparison of FIGS. 4 and 5, it will be appreciated that engine drive torque is provided by the electromagnetic motor/generator as acceleration support during engine acceleration. In one embodiment of this invention, a control system in controlling combination with the electromagnetic motor/generator detects and provides the energy or power required to overcome some and desirably substantially all of the friction and nonlinear hydrodynamic forces, and powers the electromagnetic motor/generator accordingly.

The combustion engine continues generating the traction torque to accelerate the vehicle and the electromagnetic motor/generator primarily facilitates in increasing the speed of the combustion engine. This approach modifies how the combustion engine will operate and move about or, in other words, modifies the operating loci in its torque-speed characteristics curve. Thus, the combustion engine is able to respond to acceleration requests faster and more dynamically.

In one embodiment of this invention, the control strategy provides acceleration support to the combustion engine based on an acceleration demand of the combustion engine. As used herein, "acceleration demand" refers to the amount of additional power needed to overcome some and desirably all of the frictional forces and/or nonlinear hydrodynamic forces within the combustion engine. Thus, the acceleration demand of a combustion engine is a function of the frictional forces and nonlinear hydrodynamic forces within that engine.

The acceleration demand of an engine can be determined by means known in the art. The acceleration demand can be determined by one or more measurable parameters of at least one of the combustion engine, crankshaft, and the electromagnetic motor/generator. In one embodiment of this invention, the acceleration demand of an engine is determined from one or more parameters such as, for example, crankshaft acceleration rate, engine friction, nonlinear hydrodynamic forces, combustion engine temperature, electromagnetic motor/generator temperature, battery charge, an electrical load demand, and combinations thereof. The parameters can be determined using, for example, sensors, transducers, and estimation techniques currently known and/or available to one skilled in the art. The acceleration demand is determined mathematically from one or more parameters. As will be appreciated by one skilled in the art following the teachings herein provided, each parameter, or combination of parameters, is related by mathematical expressions and can provide values for torque, speed, power, energy, and/or electrical current of the system. The mathematical expressions are equivalent representation of mechanical, electrical, and/or electromechanical physical systems. The calculated parameters are combined to determine the final value of torque, speed, power, energy, and/or electrical current needed to achieve the desired acceleration support. The parameters can be determined as a fixed value and programed into a control system for operating the electromechanical motor/generator during vehicle production or a control system can measure the parameters and calculate the acceleration demand for a given engine acceleration during engine operation.

During acceleration of the engine, a control system powers the electromagnetic motor/generator with an electrical current from a battery system. The electromagnetic motor/generator adds torque to the crankshaft and increases the rotational speed of the crankshaft. By increasing the rotational speed of the crankshaft, the electromagnetic motor/generator increases the acceleration rate of the combustion engine. In one embodiment of this invention, the electrical current from the battery system to the electromagnetic motor/generator is proportional to the acceleration demand, thereby providing the necessary power to the electromagnetic motor/generator to add sufficient torque to desirably satisfy the acceleration demand.

The electromagnetic motor/generator of this invention is adapted to function at times as a power source adding torque to rotate the crankshaft and at other times to function as a power generator for subtracting torque from the crankshaft to provide electrical current to the battery system. In one embodiment of this invention, during combustion engine acceleration, an acceleration demand of the combustion engine is determined during engine acceleration and a control system directs a first electrical current, proportional to the acceleration demand, from the battery system to the electromagnetic motor/generator to add torque to the crankshaft. During periods of engine operation when the engine is not accelerating, i.e., periods when there is no acceleration demand, or when the control system otherwise determines either a low electrical charge of the battery system or a high vehicle electrical operating load, the electromagnetic motor/generator can switch from the drive mode to a generation mode. In the generation mode, the electromagnetic motor/generator is powered with torque from the crankshaft, not the first electrical current. The electromagnetic motor/generator produces a second electrical current by subtracting torque from the crankshaft. The control system directs the second electrical current to the battery system to charge the battery system and/or provide additional electrical load to for the vehicle.

Figure 6:
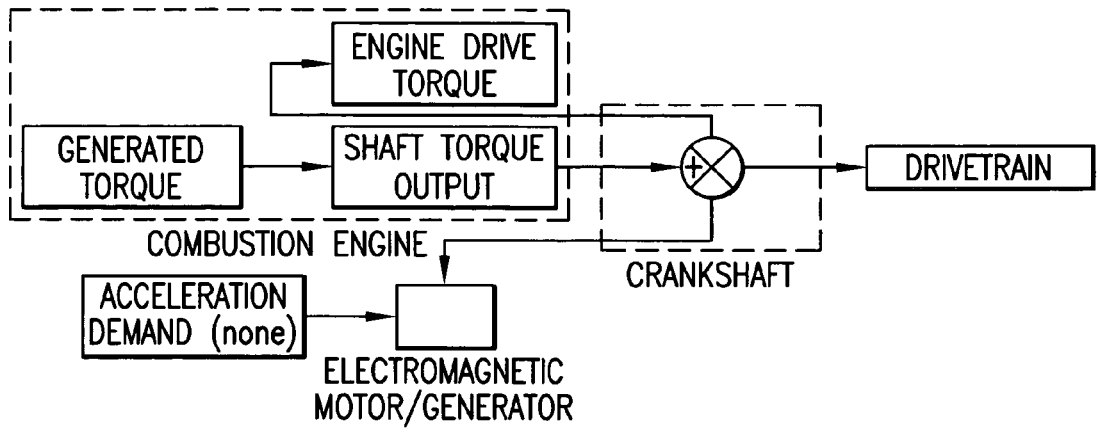
FIG. 6 is a block diagram of torque flow in a vehicle drive system with an electromagnetic motor/generator during generation mode according to one embodiment of this invention.

In the generation mode, as shown in FIG. 6, the combustion engine powers the electromagnetic motor/generator for generating power in addition to the combustion engine providing traction power for moving the vehicle. Such a dual operation is similar to typical alternator systems in conventional vehicles. However, in the method of this invention, the electromagnetic motor/generator reduces, or eliminates (particularly in cases of exceptionally large engine acceleration), power generation during engine acceleration and uses that power to raise the crankshaft speed. In other words, the electromagnetic motor/generator reduces its load on the combustion engine and transforms that power into engine speed.

Figure 7:
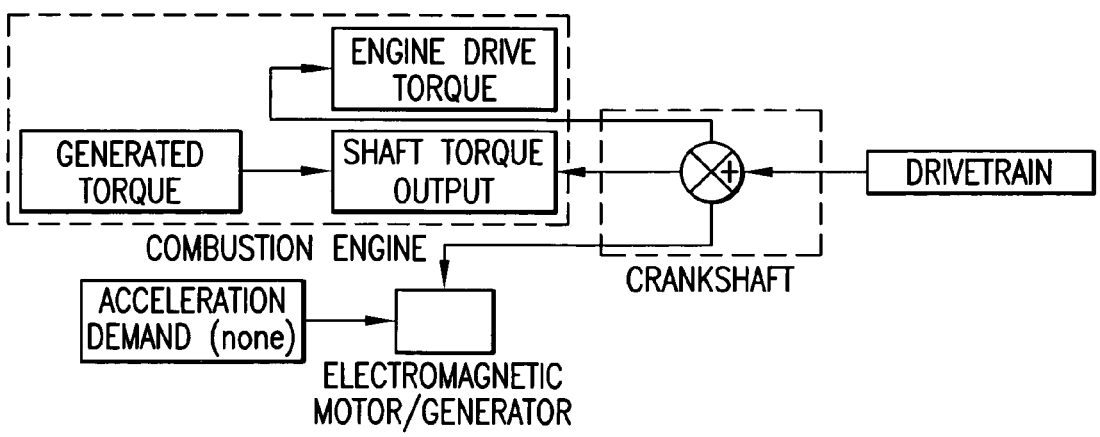
FIG. 7 is a block diagram of torque flow in a vehicle drive system with an electromagnetic motor/generator during regeneration mode according to one embodiment of this invention.

In a regeneration mode, as shown in FIG. 7, the electromagnetic motor/generator receives power from the drivetrain to generate power. In the regeneration mode, such as, for example, during vehicle deceleration and/or braking, the only torque input to the crankshaft is from the drivetrain. In both the generation mode and the regeneration mode, the electromagnetic motor/generator is generating electrical power. In the method of this invention, similarly as described above for the generation mode, upon a determination of an acceleration demand, the electromagnetic motor/generation again is powered to add torque to the crankshaft to overcome friction and nonlinear forces within the combustion engine to accelerate the combustion engine components.

Thus, the method of this invention is a control strategy that extends the currently known uses of an electromagnetic motor/generator, i.e., an integrated starter/alternator, beyond the known engine starting and power generation uses. The method of this invention allows the electromagnetic motor/generator to be used in conventional vehicles for combustion engine acceleration support, and enables the engine to accelerate faster, ensures more reliable and smoother acceleration, provides enhanced vehicle maneuverability, lowers the stress as well as response time of the combustion engine, and improves the overall vehicle efficiency.

Figure 8:
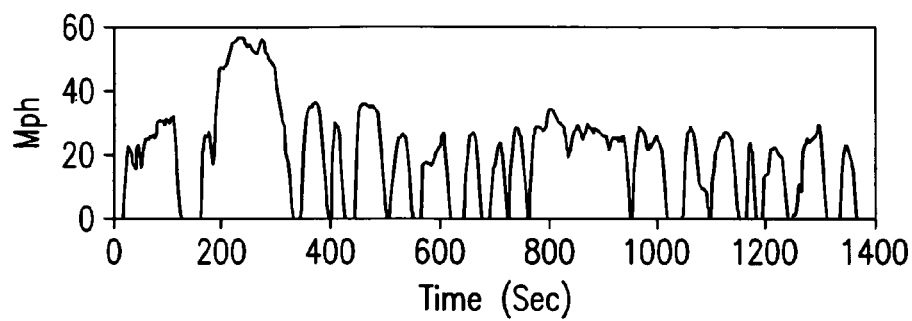
FIG. 8 is a graphical representation of an Urban Dynamometer Drive Schedule (UDDS) cycle used to demonstrate the benefits of the method of another embodiment this invention.

To demonstrate the control strategy method of this invention, a 42 volt, 5 kilowatt electromagnetic motor/generator was designed and simulated for a VOLVO S80 automobile having a 2.9 L six cylinder engine in ADVISOR (Advanced Vehicle Simulator), available from National Renewable Energy Laboratory, over an Urban Dynamometer Drive Schedule (UDDS) cycle summarized below in Table 1 and graphically represented in FIG. 8. The electromagnetic motor/generator was designed to provide an acceleration support to the engine whenever an acceleration demand of about 236 revolutions per second or higher was requested at the crankshaft. The electromagnetic motor/generator provided acceleration support to the combustion engine to reach a desired combustion engine speed.

TABLE 1

| Parameter | Defined Value |
| --- | --- |
| Time | 1369 seconds |
| Distance | 7.45 miles |
| Maximum Speed | 56.7 miles |
| Average Speed | 19.58 miles |
| Maximum Acceleration | 4.84 feet/second$^2$ |
| Maximum Deceleration | −4.84 feet/second$^2$ |
| Average Acceleration | 1.66 feet/second$^2$ |
| Average Deceleration | −1.60 feet/second$^2$ |
| Idle Time | 259 seconds |
| Number of Stops | 17 |
| Maximum Up Grade | 0% |
| Average Up Grade | 0% |
| Maximum Down Grade | 0% |
| Average Down Grade | 0% |

Figure 9:
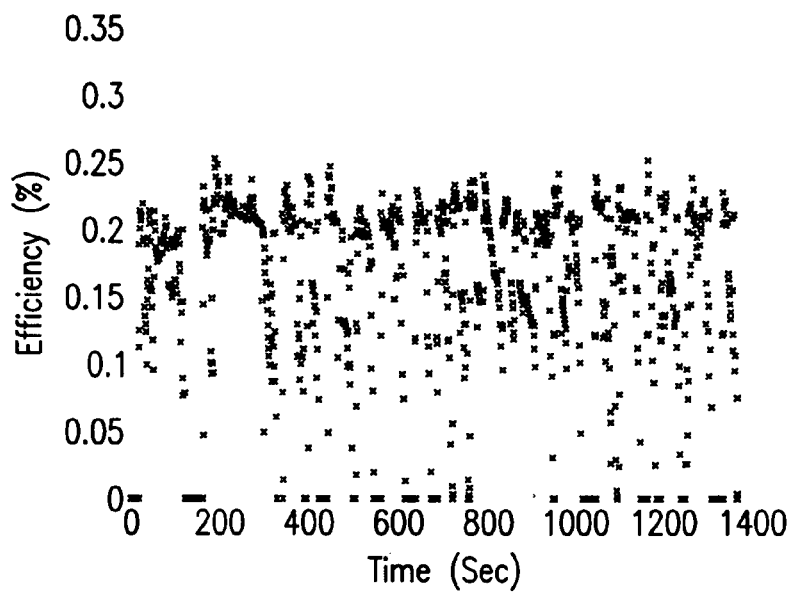
FIG. 9 is a graph showing the operating efficiency of a combustion engine not operating according to the method of this invention over the UDDS shown in FIG. 8.
Figure 10:
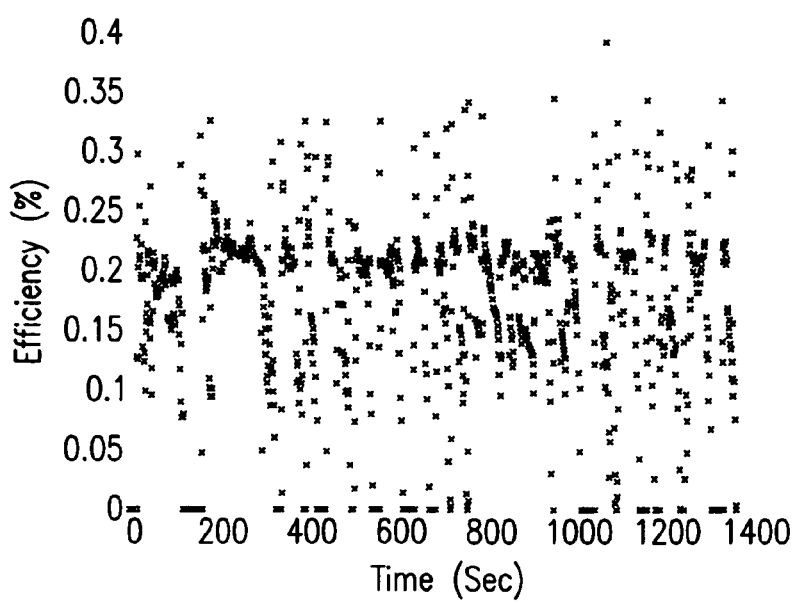
FIG. 10 is a graph showing the operating efficiency of the combustion engine operating according to the method of this invention over the UDDS shown in FIG. 8.

The use of the electromagnetic motor/generator to provide acceleration support according to this invention increased the operating efficiency of the combustion engine. FIG. 9 is a graph showing the operating efficiency of the combustion engine without incorporating the method of this invention over the UDDS of FIG. 8. FIG. 10 is a graph showing the operating efficiency of the combustion engine using the electromagnetic motor/generator according to the method of this invention over the UDDS of FIG. 8. The electromagnetic motor/generator operating efficiency points during acceleration support were moved to higher efficiency corridors of 80–85% over the speed range of 500 to 2500 rpm, thereby improving the overall vehicle performance. As demonstrated by comparing FIGS. 9 and 10, the operating efficiency points of the combustion engine, whose efficiency has traditionally deteriorated during acceleration, were found to increase peak engine efficiency from about 26% to about 39%, representing a 33.33% increase. The advantages of such acceleration support are faster and better acceleration where the engine acceleration time was cut down by about 20%. The acceleration support also smooths the sudden torque demands required for acceleration. Furthermore, the fuel consumption was reduced, resulting in improved fuel economy and lower emissions due in part to more complete fuel combustion. Fuel economy was found to increase as much as about 2.73% while the emissions such as hydrocarbons and carbon monoxide (CO) decreased by about 0.53% and about 1.33%, respectively. Nitrogen oxide (NO$_x$) emissions were reduced by about 1.50%. With much of the current emission standards being based on NO$_x$ emission level, the method of this invention can prove to be a vital tool for automotive manufacturers to comply with the standards.

Additional benefits provided by the method of this invention included the avoidance of a power drain from the batteries, as the peak power for acceleration support was only up to about 2 kilowatts. No significant fall in the discharge efficiency was found and the minimum discharge efficiency remained the same at about 90% (for both cases, with and without acceleration support). This increases the life and performance of the battery system. Moreover, this is achieved at 42 volts rather than 100 volts or higher, thus, making the system safer for operation.

The electromagnetic motor/generator provided acceleration support when the vehicle started to move after a halt and also as needed during the entire drive cycle. The 5 kilowatt electromagnetic motor/generator was capable of directing up to about 10 Newton-meters (Nm) of continuous torque for acceleration support over the entire speed range of 0–6000 rpm. This acceleration support by the electromagnetic motor/generator also reduced or eliminated crankshaft vibrational resonance that is generally associated with abrupt engine acceleration.

The acceleration support was provided by the electromagnetic motor/generator depending on the state of charge of the battery system, temperature of the electromagnetic motor/generator, converters, and combustion engine, as well as electric loads. The state of charge high and low were defined as 0.7 and 0.6 kilowatts, respectively. If the state of charge level fell below the average of high and low state of charge values, the acceleration support was withdrawn in order to maintain the electrical power system with the electromagnetic motor/generator operating as generator, i.e., an alternator. Similarly, during high constant load conditions such as above 5.2 kilowatts, the electromagnetic motor/generator was prioritized to operate as a generator. The electromagnetic motor/generator was able to provide 85% acceleration support up to a load of 5.2 kilowatts. Placed in the belly of the transmission casing, the electromagnetic motor/generator had a high ambient temperature of 250° C. and, in order to prevent damage to the electromagnetic motor/generator by large current flow, the acceleration support was withdrawn at extremely high temperatures. During low engine temperatures, priority was given for acceleration support for the engine in order to facilitate a better performance provided the electrical power system charge was sustained.

Thus, the invention provides a method that uses known electromagnetic motor/generators in a new manner. By using electromagnetic motor/generators to provide engine acceleration support in conventional combustion engines, engine acceleration and vehicle performance are improved while emissions are reduced.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of increasing an acceleration rate of a combustion engine during combustion engine acceleration, the combustion engine including a crankshaft, the method comprising:

providing an electromagnetic motor/generator in rotating combination with the crankshaft, the electromagnetic motor/generator adapted to rotate the crankshaft upon receiving an electrical current from a battery system;

determining an acceleration demand of the combustion engine, wherein the acceleration demand is an amount of power needed to overcome at least one of a frictional force and a nonlinear hydrodynamic force within the combustion engine;

powering the electromagnetic motor/generator with the electrical current, wherein the electrical current is proportional to the acceleration demand; and increasing the rotational speed of the crankshaft by the electromagnetic motor/generator;

wherein increasing the rotational speed of the crankshaft by the electromagnetic motor/generator increases the acceleration rate of the combustion engine.

2. The method according to claim 1, wherein the electrical current has a power of about 5 kilowatts.

3. The method according to claim 2, wherein the battery system is a 42 volt battery system.

4. The method according to claim 1, additionally comprising determining the acceleration demand of the combustion engine at the crankshaft.

5. The method according to claim 1, additionally comprising determining the acceleration demand of the combustion engine from a parameter selected from a group including crankshaft acceleration rate, engine friction, non-linear hydrodynamic forces, combustion engine temperature, electromagnetic motor/generator temperature, battery charge, electrical load demand, and combinations thereof.

6. The method according to claim 5, additionally comprising determining the parameter using at least one of transducers and estimation techniques.

7. The method according to claim 6, wherein the acceleration demand is determined mathematically using at least one parameter.

8. The method according to claim 3, wherein while the combustion engine is operating and not accelerating, the electromagnetic motor/generator generates an electrical current and charges the battery system.

9. The method according to claim 8, wherein the crankshaft powers the electromagnetic motor/generator to recharge the battery system.

10. The method of claim 1, wherein the electromagnetic motor/generator comprises:
a disc-shaped rotor connected to the crankshaft; and
a stator disposed at least partially around the rotor and fixedly connected to an engine body of the combustion engine;
wherein the rotor rotates within the stator.

11. The method of claim 1, wherein the electromagnetic motor/generator comprises:
a rotor connected to the crankshaft; and
a disc-shaped stator fixedly connected to an engine body of the combustion engine;
wherein the rotor rotates external to the stator.

12. A method of operating a vehicle including a combustion engine, a transmission, an electromagnetic motor/generator, and a control system, the combustion engine having a crankshaft connected to the transmission, the electromagnetic motor/generator in rotational combination with the crankshaft and connected to a battery system, and the control system in controlling combination with the electromagnetic motor/generator, wherein the electromagnetic motor/generator is adapted to function at times as a power source adding torque to rotate the crankshaft and at other times to function as a power generator for subtracting torque from the crankshaft to provide electrical current to the battery system, the method comprising:

determining an acceleration demand of the combustion engine during engine acceleration, wherein the acceleration demand is an amount of power needed to overcome at least one of a frictional force and a nonlinear hydrodynamic force within the combustion engine;

directing with the control system a first electrical current from the battery system to the electromagnetic motor/generator during combustion engine acceleration, wherein the first electrical current is proportional to the acceleration demand;

powering the electromagnetic motor/generator with the first electrical current during acceleration of the combustion engine to add torque to the crankshaft;

determining one of a low electrical charge of the battery system and a high vehicle electrical operating load;

powering the electromagnetic motor/generator with the crankshaft to produce a second electrical current; and directing with the control system the second electrical current to the battery system, wherein the second electrical current charges the battery system.

13. The method according to claim 12, wherein the battery system is a 42 volt battery system.

14. The method according to claim 13, wherein the first electrical current has a power of about 5 kilowatts.

15. The method according to claim 12, additionally comprising determining the acceleration demand of the combustion engine from a parameter selected from a group including crankshaft acceleration rate, engine friction, non-linear hydrodynamic forces, combustion engine temperature, electromagnetic motor/generator temperature, battery charge, electrical load demand of the vehicle, and combinations thereof.

16. The method according to claim 15, additionally comprising determining the parameter using at least one of transducers and estimation techniques.

17. The method according to claim 16, wherein the acceleration demand is determined mathematically using at least one parameter.

18. The method according to claim 12, wherein the electromagnetic motor/generator produces the second electrical current while the combustion engine is operating and not accelerating.

19. The method of claim 12, wherein the electromagnetic motor/generator comprises:
a disc-shaped rotor connected to the crankshaft; and
a stator disposed at least partially around the rotor and fixedly connected to an engine body of the combustion engine;
wherein the rotor rotates within the stator.

20. The method of claim 12, wherein the electromagnetic motor/generator comprises:
a rotor connected to the crankshaft; and
a disc-shaped stator fixedly connected to an engine body of the combustion engine;
wherein the rotor rotates external to the stator.

21. A method of increasing an acceleration rate of a combustion engine during combustion engine acceleration, the combustion engine including a crankshaft, the method comprising:

providing an electromagnetic motor/generator in rotating combination with the crankshaft, wherein the electromagnetic motor/generator comprises an integrated starter/alternator having a capacity of about 2 kilowatts to about 6 kilowatts and adapted to rotate the crankshaft upon receiving an electrical current from a battery system;

determining an acceleration demand of the combustion engine;

powering the electromagnetic motor/generator with the electrical current, wherein the electrical current is proportional to the acceleration demand; and increasing the rotational speed of the crankshaft by the electromagnetic motor/generator;

wherein increasing the rotational speed of the crankshaft by the electromagnetic motor/generator increases the acceleration rate of the combustion engine.

* * * * *